United States Patent [19]
Brown, Jr.

[11] 3,917,234
[45] Nov. 4, 1975

[54] BEVERAGE STIRRER
[75] Inventor: Robert R. Brown, Jr., Fairbanks, Alaska
[73] Assignee: The Raymond Lee Organization, Inc., a part interest
[22] Filed: June 24, 1974
[21] Appl. No.: 482,014

[52] U.S. Cl............. 259/1 R; 259/DIG. 17; 99/288
[51] Int. Cl.² ........................................ B01F 13/02
[58] Field of Search... 15/4, 405; 259/2, 1, DIG. 17; 99/281, 288, 287, 279, 323.1, 348

[56] References Cited
UNITED STATES PATENTS
1,308,685  7/1919  Salvio .................................. 15/405
3,060,472  10/1962  Horton .................................. 15/4
3,661,315  5/1972  Helton .................................. 15/405

Primary Examiner—Robert W. Jenkins

[57] ABSTRACT

A stream of warm air is blown downward into a cup containing a beverage, stirring the beverage by introducing turbulence into it. The direction of the stream with respect to the cup is continuously changed to increase the agitation of the beverage.

2 Claims, 2 Drawing Figures

BEVERAGE STIRRER

SUMMARY OF THE INVENTION

The invention is directed towards stirring beverages in cups by blowing hot air into such cups and thereby agitating the beverage.

Accordingly, a first means produces a stream of air under pressure. This air is passed through a heating element to heat the air. The stream is then passed through a vertically disposed nozzle which can rotate about a vertical axis not coincident with the axis of the nozzle, and which directs the stream downwardly into the cup. This stream introduces turbulence in the beverage, agitating it. As the nozzle rotates, the direction of the stream changes, increasing the agitation action.

A horizontal platform disposed below the nozzle is fitted with a pressure sensitive switch, so disposed and connected that when a cup is placed upon the platform below the nozzle, both the first means and the heating element are energized. When the cup is removed from the platform, the first means and the heating element are de-energized.

DETAILED DESCRIPTION OF PREFERRED EMBODIMENTS

Figure 1:
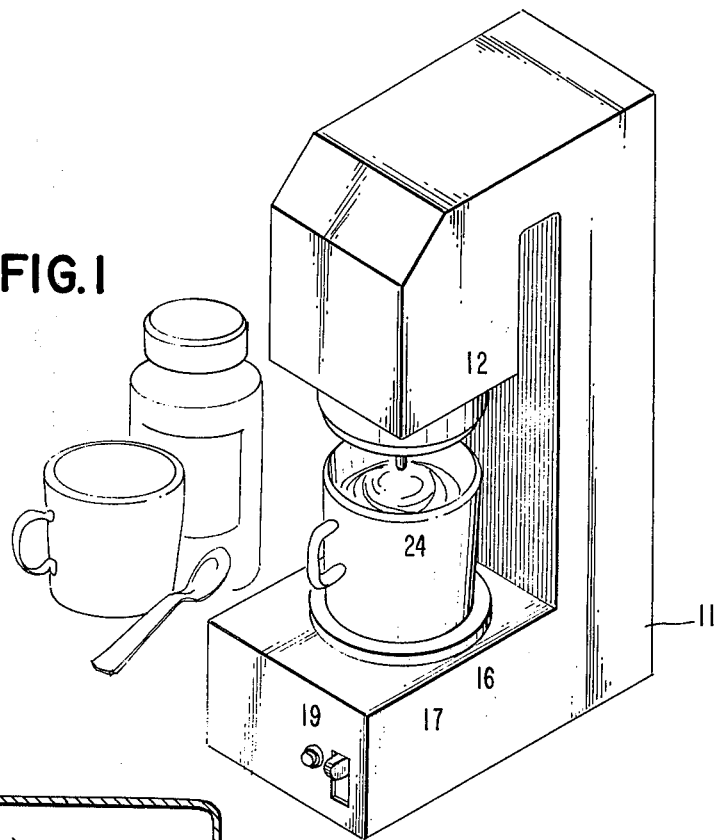
FIG. 1 is a drawing of the invention in use.
Figure 2:
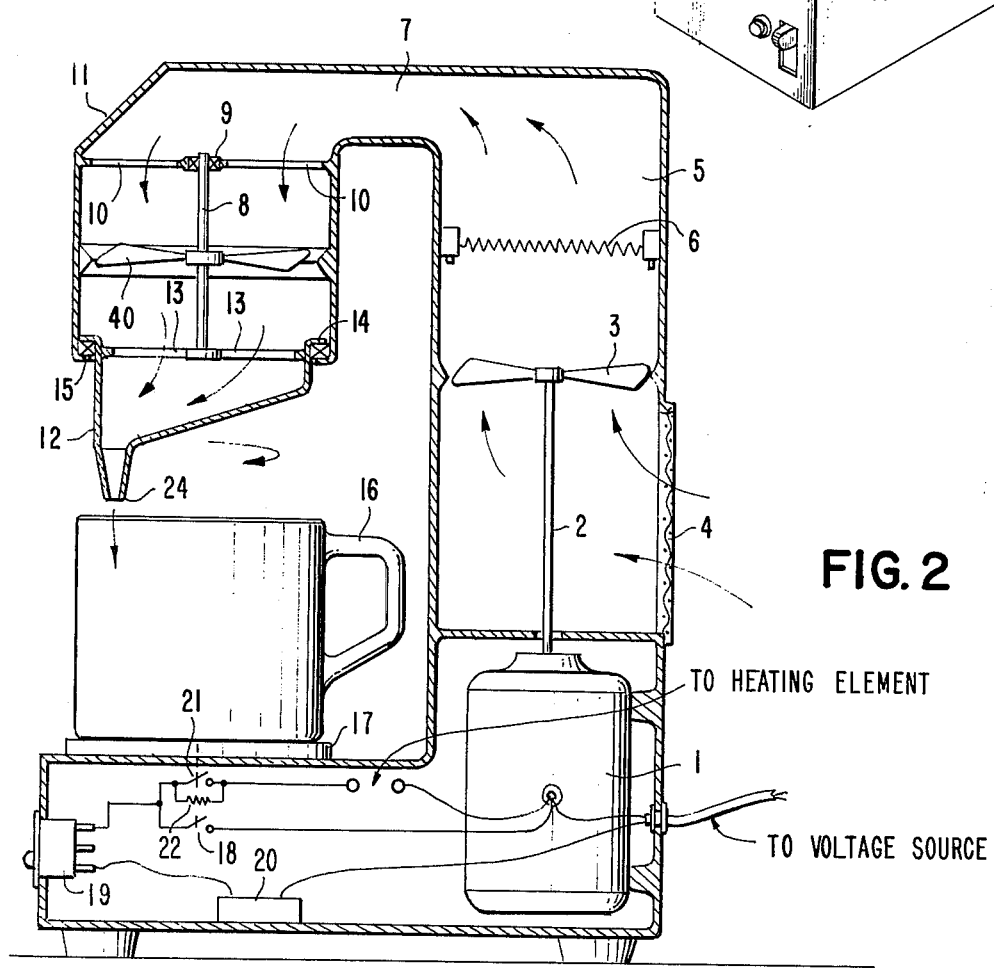
FIG. 2 is a side cross-sectional view of the invention.

Referring now to FIGS. 1 and 2, an electric motor 1, with an elongated shaft 2 disposed vertically and extending upwardly from the motor, drives a fam 3, which draws air through a filter 4 in side port 26 of casing 11 into the device. The air thus drawn in is passed past a heating element 6 in vertically disposed cavity 5 after which it is conducted through a horizontal passageway 7 to a vertically disposed dispensing mechanism.

This mechanism consists of a vertical elongated shaft 8 secured at its upper extremity by a bearing 9. The bearing allows the shaft to rotate freely, and is itself supported by horizontally disposed struts 10 connected to the casing 11. The shaft bears a fan 40 horizontally disposed intermediate the ends of the shaft. The lower end of the shaft is rigidly connected to a dispenser 12 by thin horizontal struts 13. The dispenser takes the form of a quasi-funnel whose smaller orifice takes the shape of a vertical nozzle, offset from the center of the device. A lip 14 around the upper portion of the dispenser rests upon a seal 15.

When a cup 16 filled with beverage is placed upon a horizontal platform 17 disposed below the dispenser, a pressure sensitive switch (not shown) closes switch 18, causing current to flow through closed on-off switch 19, current limiter 20, and the motor. This causes fan 3 to turn, and forces a stream of air through the filter to fan 40. The pressure of the air causes the shaft 8 to rotate, and thus causes the dispenser to rotate. The lip riding on the seal prevents air from escaping except through the nozzle 24 of the dispenser, and thus the nozzle is rotated in a horizontal plane about the axis of the shaft 8, directing air into the cup and stirring the beverage inside it.

When the cup is not placed on the platform, switch 21 is spring biased open, leaving resistor 22 in series with the heating element and keeping it at a low heat level. When the switch 21 is closed by the placing of a cup upon the platform, the resistor is shorted out and the heating element produces its maximum output of heat.

While the invention has been described with detailed reference to the drawings, the protection sought is to be limited only by the terms of the claims which follow.

I claim:

1. A device for stirring beverage in a cup, said device comprising:
    a horizontal platform supporting said cup;
    a pressure sensitive switch disposed below the platform, said switch being closed when the cup rests on the platform and being open when the cup is removed from the platform;
    first means including an electrically energized heating coil connected in circuit with said switch to produce a pressurized heated stream of air when the switch is closed; and
    second means responsive to said stream to direct said stream downwardly into said cup when it is in place on the platform, said second means including a vertically disposed nozzle rotatable about a vertical axis offset from the axis of the nozzle and continuously changing the direction of said stream while said stream is directed downwardly into the cup.

2. The device of claim 1 wherein said second means includes a vertical shaft rotatable about its axis and a horizontal fan disposed around the vertical shaft and secured thereto, the shaft axis defining said vertical axis, said fan being rotated by the flow of said stream therethrough to rotate sais shaft, said nozzle forming part of a dispenser connected to said shaft and rotated therewith, said nozzle being horizontally spaced from said shaft.

* * * * *